United States Patent [19]
Bartley

[11] Patent Number: 5,030,960
[45] Date of Patent: Jul. 9, 1991

[54] MONOPULSE ANTENNA WITH IMPROVED SIDELOBE SUPPRESSION

[75] Inventor: Steven W. Bartley, Thousand Oaks, Calif.

[73] Assignee: Hughes Aircraft Company, Los Angeles, Calif.

[21] Appl. No.: 647,190

[22] Filed: Jan. 24, 1991

Related U.S. Application Data

[63] Continuation of Ser. No. 526,965, May 21, 1990, abandoned, which is a continuation of Ser. No. 255,223, Oct. 11, 1988, abandoned, which is a continuation of Ser. No. 931,571, Nov. 17, 1986, abandoned.

[51] Int. Cl.[5] ......................... G01S 5/02; G01S 13/00
[52] U.S. Cl. ..................................... 342/427; 342/149
[58] Field of Search ................ 342/149, 153, 379–381, 342/383–384, 427

[56] References Cited

FOREIGN PATENT DOCUMENTS 0142607 8/1983 Japan .................................. 342/427
0182306 10/1983 Japan .

OTHER PUBLICATIONS

Wong et al., "A Multielement High Power Monopulse Feed with Low Sidelobe and High Aperture Efficiency", IEEE Trans. on Antennas & Prop. vol. AP 22, No. 3, 5/74.

*Primary Examiner*—Gregory C. Issing
*Attorney, Agent, or Firm*—C. D. Brown; R. M. Heald; W. K. Denson-Low

[57] ABSTRACT

The invention is a radar system using sum and difference signals for tracking targets, wherein the system includes aperture means having a cross sectional area for transmitting energy toward a target and receiving return energy; and circuit means for generating sum and difference signals, the circuit means being selectively coupled to said aperture means, with the sum signal being generated using energy from the entire aperture means and with the difference signals being generated using return energy from the aperture means exclusive of energy from a predetermined area. The invention permits simultaneous optimization of the sum and difference signals and also suppresses the near-in sidelobes in the difference signals.

2 Claims, 5 Drawing Sheets

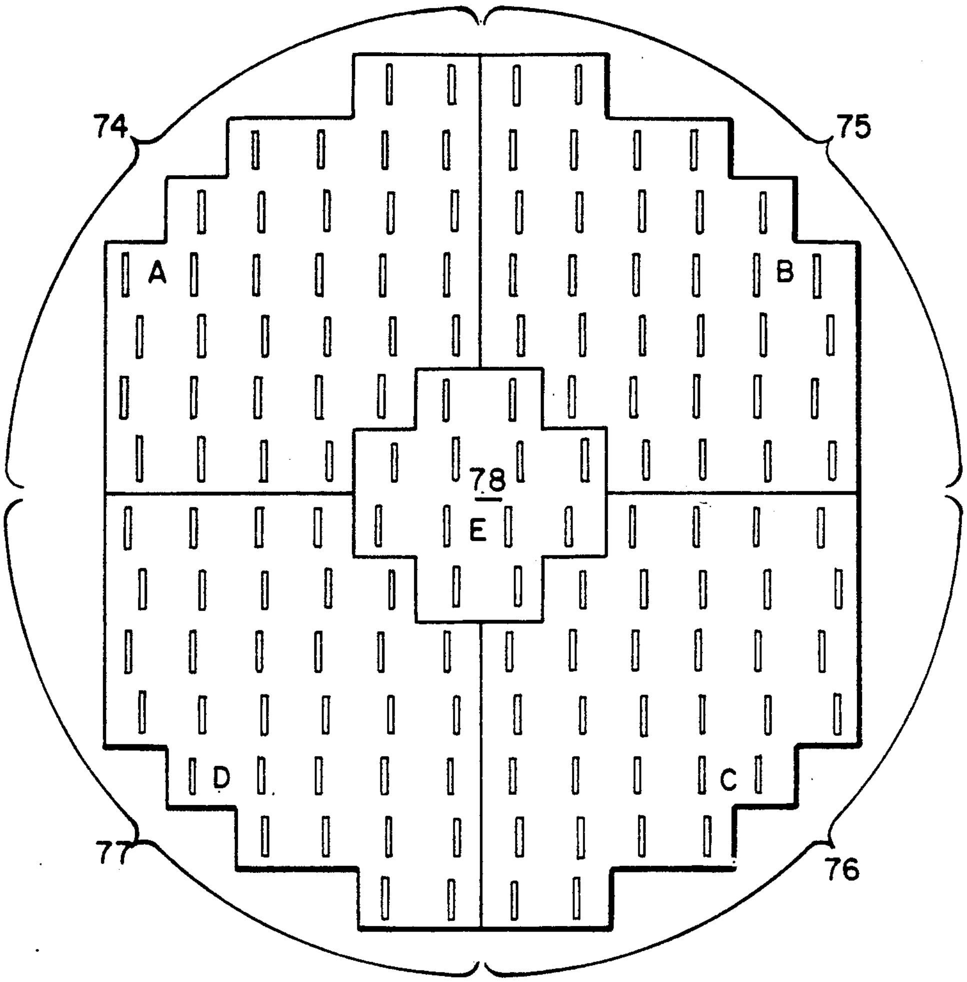
Fig. 3a.
Fig. 3b.
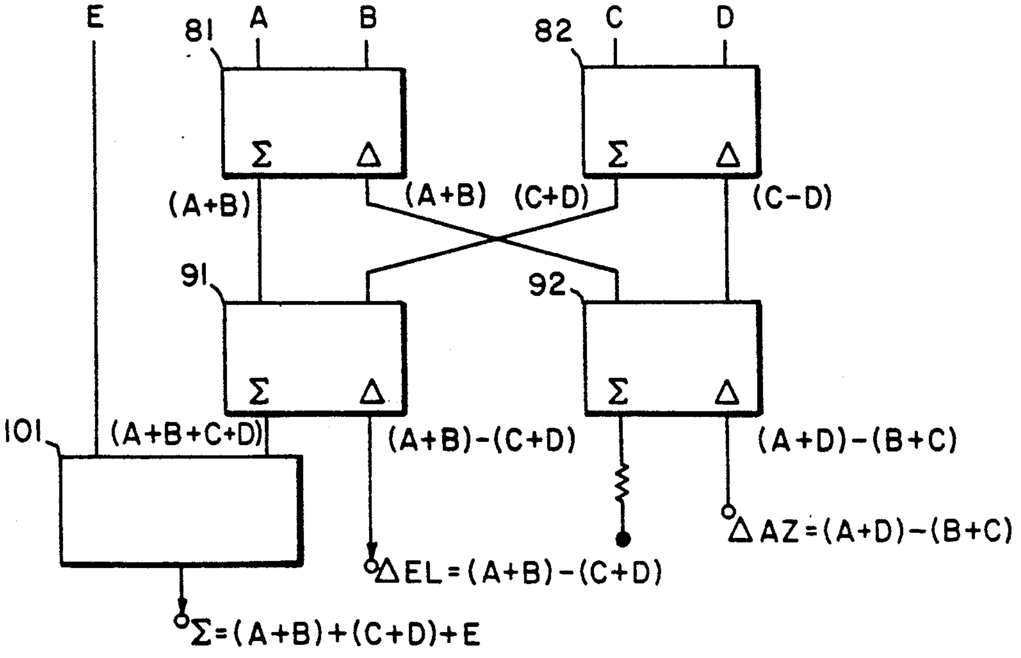

MONOPULSE ANTENNA WITH IMPROVED SIDELOBE SUPPRESSION

This is a continuation of application Ser. No. 07/526,965 filed May 21, 1990 now abandoned, which is a continuation of application Ser. No. 07/255,223, filed Oct. 11, 1989 now abandoned, which is a continuation of application Ser. No. 931,571, filed Nov. 17, 1986 now abandoned.

BACKGROUND OF THE INVENTION

The present invention relates to optimization of antenna sum and difference patterns, and in particular, to a sidelobe suppression arrangement for a monopulse antenna using sum and difference patterns to track targets.

As is generally known, a monopulse antenna may be subdivided into sections, for example, by using horns or quadrants, and the radar then senses the target displacement by comparing the amplitude and phase of the echo signal for each horn or quadrant.

The RF circuitry for a conventional antenna divided into quadrants subtracts the output of the left pair from the output of the right pair to sense any imbalance in the azimuth direction (azimuth difference pattern) and the output of the top pair from the output of the bottom pair to sense any imbalance in the elevation direction (elevation difference pattern). See Radar Handbook, Merrill Skolnick, McGraw Hill, 1970. The subtracter outputs, i.e., the difference patterns, are zero when the target is on axis, increasing in amplitude with increasing displacement of the target from the antenna axis.

A sum signal, usually representative of the energy received over the entire aperture, is generated and used as a reference signal, for video input, and for gain control.

There are many trade-offs in feed design and radiation patterns because optimum sum and difference signals, low sidelobe levels, polarization diversity, compactness, and simplicity cannot all be fully satisfied simultaneously, especially when using a single feed. Historically, a common approach has been to optimize the sum pattern and to tolerate the resulting difference pattern signal. However, it is generally regarded that optimizing undesirable features of the difference patterns are important in eliminating significant tracking problems. See Corlin, U.S. Pat. No. 4,525,716; June 15, 1985. For example, high sidelobes in the difference signals increase radar susceptibility to interference from background clutter or other off axis sources of radiation which results in tracking error and loss of efficiency.

SUMMARY OF THE INVENTION

The problem of simultaneously optimizing the sum and difference signals in view of the above stated design considerations has been solved in accordance with the invention. The invention is a radar system using sum and difference signals to track targets including aperture means having a cross sectional area for transmitting energy toward a target and receiving return energy and circuit means selectively coupled to said aperture means, said circuit means generating a sum signal using return energy from said aperture means and generating difference signals using return energy from said aperture means exclusive of energy from a predetermined cross-sectional area, whereby said sum and difference signals are simultaneously optimized for the system.

BRIEF DESCRIPTION OF THE DRAWINGS

FIG. 3*a* is an alternative embodiment of the invention showing an aperture having an array of elements partitioned into quadrants and a selectively excluded center section;

FIG. 3*b* is a sum and difference network for providing desired sum and difference signals for the embodiment of FIG. 3*a;*

DETAILED DESCRIPTION OF THE DRAWINGS

Figure 1:
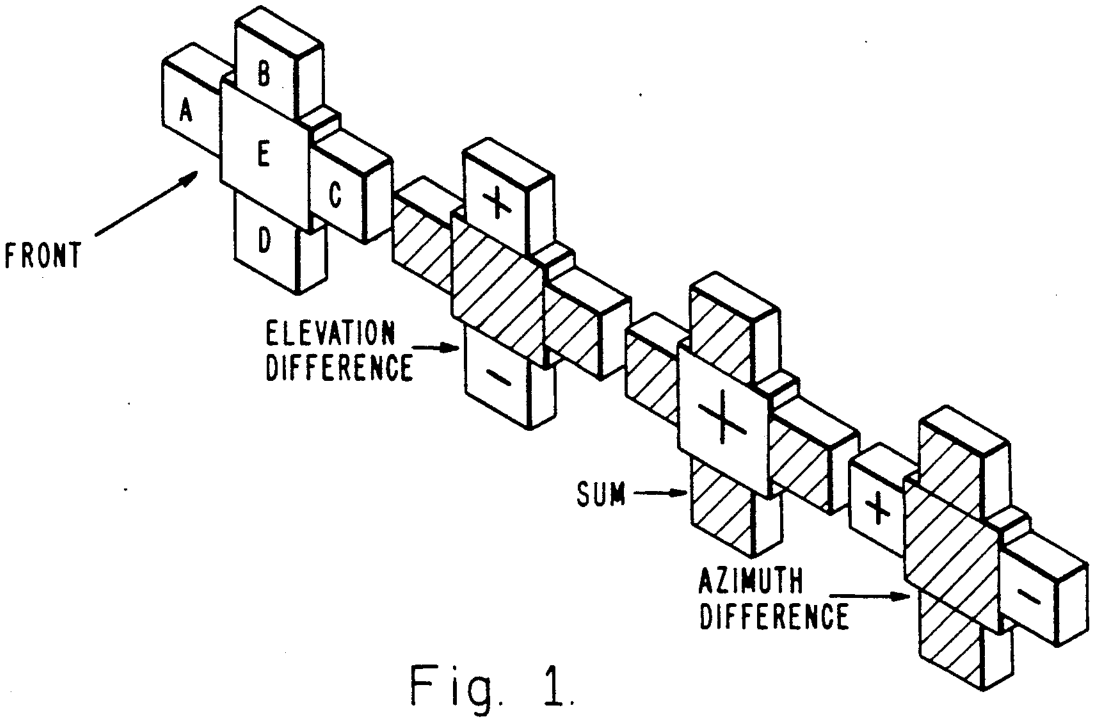
FIG. 1 is a conventional five horn antenna for providing sum and difference patterns.

Refer again to FIG. 1. There is shown a conventional five horn feed antenna for providing sum and difference signals. As shown in FIG. 1, five horn antennas A, B, C, D, E are arranged with antenna A, the left antenna; B, the top antenna; C the right antenna; D, the bottom antenna; and E, the antenna filling the center space around which antennas A, B, C, and D are arranged. An elevation difference signal is obtained by subtracting the return energy from antenna D from the return energy of antenna B and an azimuth difference signal is provided by subtracting the return energy of antenna C from the return energy of antenna A. A sum signal is provided by the return energy of antenna E alone. This form of antenna feed and others have been used in tracking radar systems but have suffered from the problem of achieving high sum gain while preserving low sidelobes in the difference patterns. Similar problems are encountered where the antenna consists of a single aperture containing an array of radiating elements and the difference patterns are similarly generated using one half the aperture minus the opposite half of the aperture.

Figure 2A:
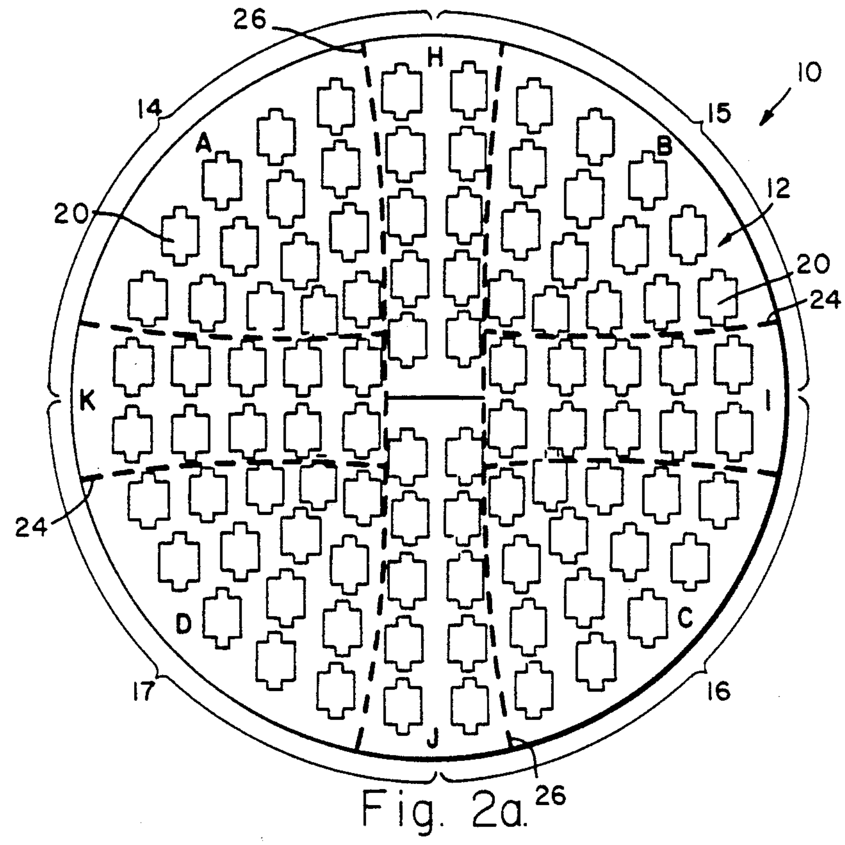
FIG. 2*a* is an embodiment of the invention showing an aperture having an array of elements partitioned into quadrants and strips.
Figure 2B:
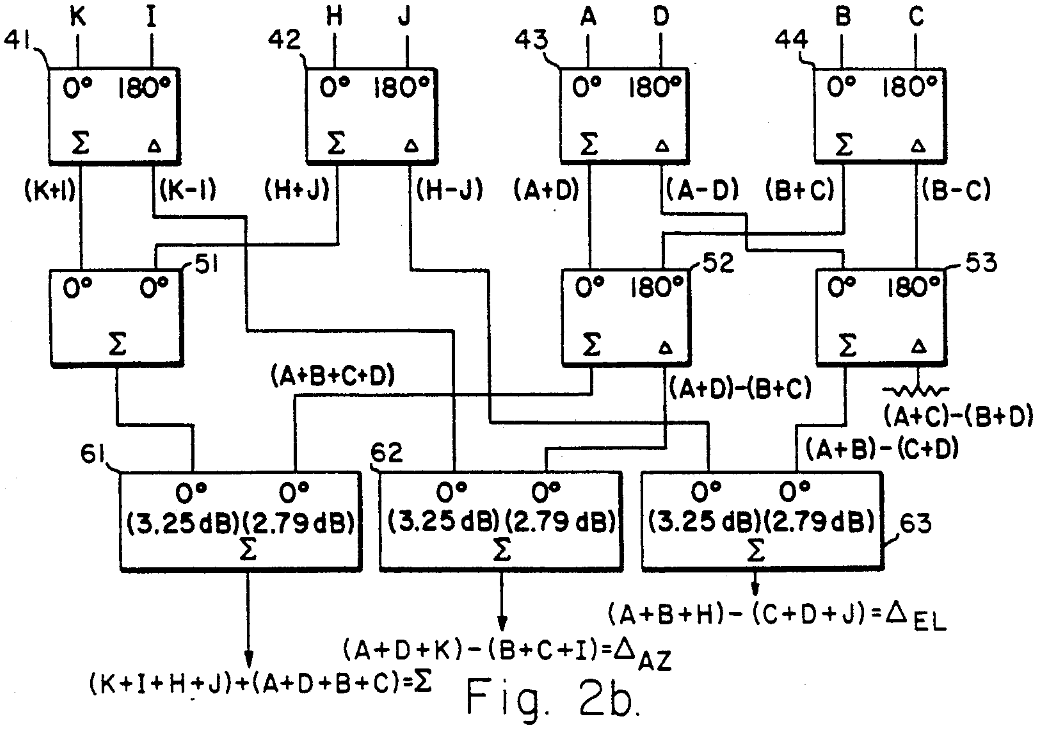
FIG. 2*b* is a sum and difference network for providing desired sum and difference signals for the embodiment of FIG. 2*a;*
Figure 4A:
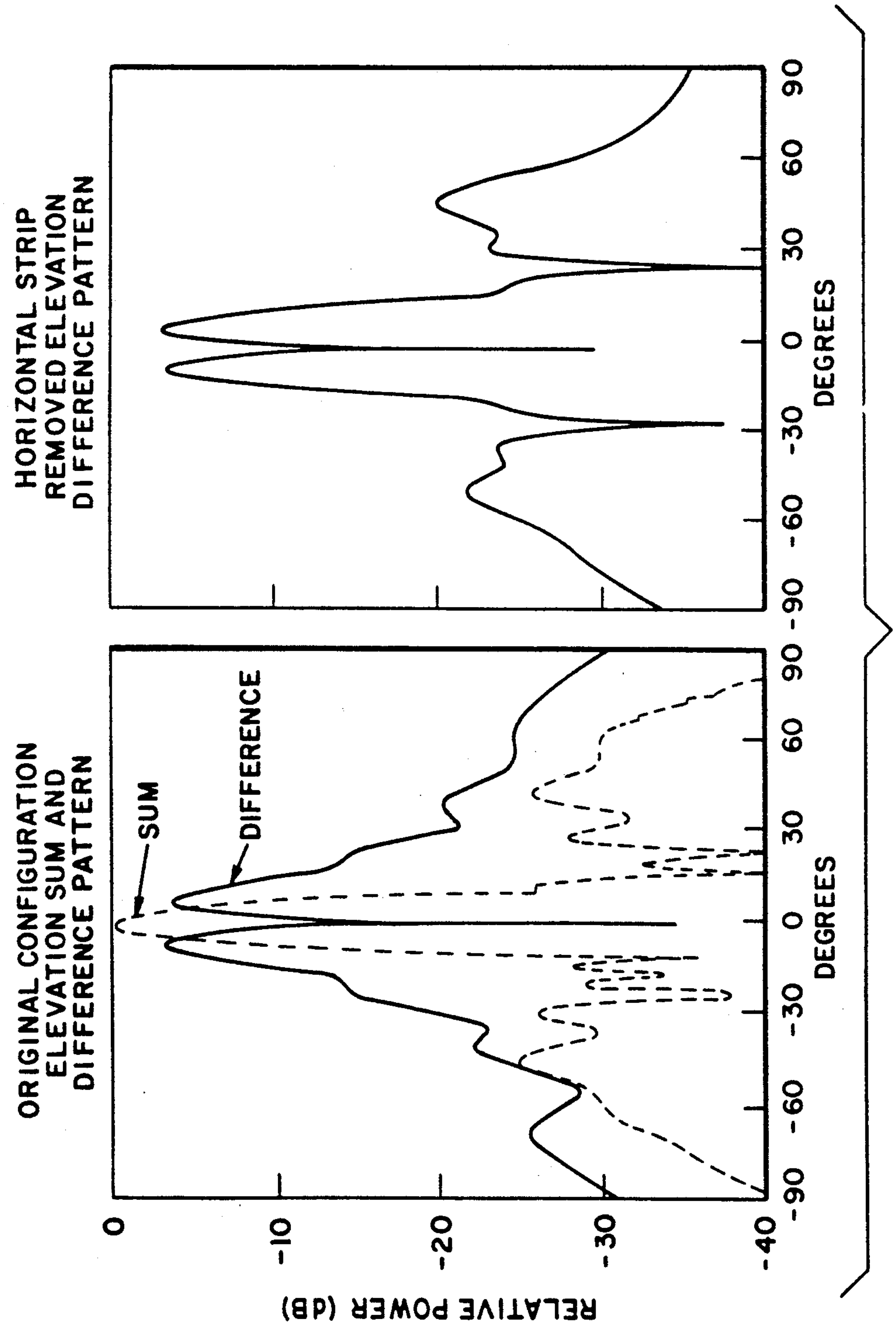
FIG. 4*a* is a comparison of the elevation difference pattern signals for the embodiment of FIG. 2*a,* before and after selectively excluding elements along the elevation axis in generating the signals.
Figure 4B:
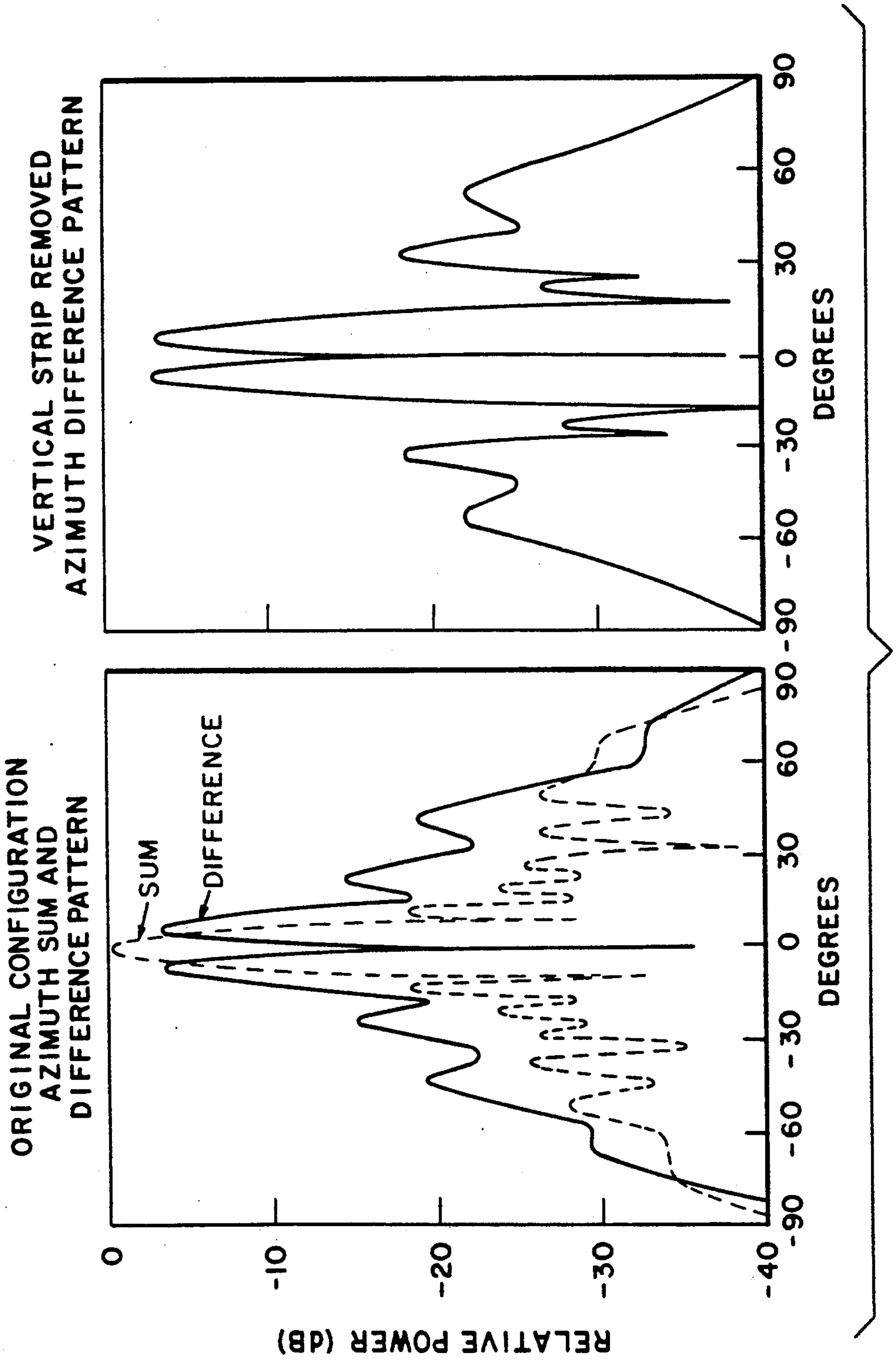
FIG. 4*b* is a comparison of the azimuth difference pattern signals for the embodiment of FIG. 2*a,* before and after selectively excluding elements along the azimuth axis in generating the pattern signals.

Referring now to FIG. 2*a,* there is shown an embodiment of the invention, although it is understood that other embodiments may be derived from the disclosed invention. In FIG. 2*a,* the antenna 10 is shown as having an aperture 12 circular in shape and as having an array of radiating and receiving elements 20. The antenna is a broadband antenna designed to operate, for example, in a missile. The aperture is partitioned into substantially equal and symmetrical quadrants 14, 15, 16, 17. Quadrants 14 and 15 define the top elevation hemisphere for aperture 12, while quadrants 16 and 17 define the bottom elevation hemisphere for aperture 12. More particularly, quadrant 14 defines the top left quadrant, quadrant 15 the top right quadrant, quadrant 16 the bottom right quadrant, and quadrant 17 the bottom left quadrant.

Also shown in FIG. 2*a* is a horizontal strip of elements 24 along the elevation axis and a vertical strip of elements 26 along the azimuth axis. Strip 24 includes strip K, which contains elements which may be taken substantially equally from quadrants 14 and 17. Strip 24 also includes strip I which contains elements which may be taken substantially equally from quadrants 15 and 16. Strip 26 includes strip H, which contains elements which may be taken substantially equally from quadrants 14 and 15 and strip J, which contains elements which may be taken substantially equally from quadrants 16 and 17. As further shown in FIG. *2a*, quadrants A, B, C, and D refer to the remainder of quadrants 14, 15, 16, and 17 in FIG. *2a* respectively after taking the respective elements for strips 24 and 26.

In operation in this embodiment strips 24 and 26 are selectively excluded in generating the difference pattern signals, resulting in a reduction in the sidelobes for the azimuth and elevation difference patterns as further explained below.

Referring now to FIG. *2b*, there is shown a diagram of the sum and difference network for connecting the return signals from the quadrants and strips of FIG. *2b* for achieving low difference pattern sidelobes.

The sum pattern to be used for the antenna of FIG. *2a*, to be provided by the network of FIG. *2b*, is (A+B C+D)+(H+I+J+K); the azimuth difference pattern is (A+D+K)−(B+C+I); and the elevation difference pattern is (A+B+H)−(C+D+J).

To achieve the necessary combination of returns to provide the desired sum and difference patterns mentioned above, initially the return of each quadrant and strip is selectively coupled with that of one other quadrant or strip at parallel hybrids 41, 42, 43, and 44. The hybrids are standard commercially available sum and difference hybrids, i.e, sum and difference magic T's, commonly used in comparator circuits. The coupling coefficient for each hybrid would vary depending on aperture design and would be chosen to provide, as close as possible, an ideal sum distribution pattern. As shown in FIG. *2b*, the returns from strips K and I are fed into hybrid 41. The returns from strips H and J are likewise fed into hybrid 42. The returns from quadrants A and D are fed into hybrid 43. The returns from quadrants B and C are fed into hybrid 44. K and I are combined at hybrid 41 to provide (K+I) and the difference is taken at hybrid 41 to provide (K−I). The same process is repeated for H and J at hybrid 42 to provide (H+J) and (H−J); at hybrid 43 to provide (A+D) and (A−D); and at hybrid 44 to provide (B+C) and (B−C).

Referring further to FIG. *2b*, the outputs from hybrids 41, 42, 43, and 44 are selectively added and subtracted to provide further desirable combinations of quadrants A, B, C, D and strips H, I, J, and K. The (K+I) output from hybrid 41 and the (H+J) output from hybrid 42 are combined in phase at hybrid 51 for providing at the output of hybrid 51 (H+J+K+I). The (B+C) output at hybrid 44 is substracted from the (A+D) output of hybrid 43 at hybrid 52 for providing at the output of hybrid 52 (A+D)−(B+C), and is combined in phase with (B+C) to provide (A+D+B+C). The (A−D) output of hybrid 43 is likewise combined with the (B−C) output of hybrid 44 for providing at the output of hybrid 53 (A+B)−(C+D) and is subtracted at hybrid 53 to provide at the output of hybrid 53, (A+C)−(B+D) which is not used and is therefore terminated.

To provide the sum signal, (A+D+B+C)+(-H+I+J+K); the azimuth difference signal, (A+D+K)−(B+C+I); and the elevation difference signal, (A+B+H)−(C+D+J), the outputs from hybrids 51, 52, and 53 are further selectively combined.

To provide the sum signal, the output of hybrid 51, (H+J)+(K+I) is combined with the (A+B)+(C+D) output of hybrid 52 at hybrid 61 to provide (A+B+C+D)+(H+I+J+K).

To provide the azimuth difference signal, the (K−I) output of hybrid 41 is combined with the (A+D)−(B+C) output of hybrid 52 at hybrid 62 to provide (A+D+K)−(B+C+I) at the output of hybrid 62.

To provide the elevation difference signal, the (H−J) output of hybrid 42 is combined with the (A+B)−(C+D) output of hybrid 53 at hybrid 63 to provide (A+B+H)−(C+D+J) at the output of hybrid 63.

Shown in FIG. *4a* and FIG. *4b* are comparisons of measured data for the original difference signals using the whole ("original") aperture return signal of FIG. *2a* compared to the difference signals with the horizontal and vertical strips selectively excluded using the return in FIG. *2b*. The difference signals are for all practical purposes symmetrical on either side of boresight and the discussion below applies to the sidelobe patterns on both the right and left of boresight.

Refer now to FIG. *4a*. Shown is the original configuration elevation sum and difference signals (left side figure) and the elevation difference signal with horizontal strips I and K excluded (right side figure). It is observed from FIG. *4a* that the original elevation difference pattern has a near in sidelobe of aroround −15 dB at around 20°. Compare this to the right side figure of *4a*, which depicts the elevation difference pattern with the horizontal strip excluded. Here the near in sidelobes rapidly drop to near −25 dB at 30° and form deep nulls.

Even more dramatic results are displayed in FIG. *4b*. Shown are the original azimuth sum and difference signals (left side figure) and the azimuth difference signal with strips H and J excluded (right side figure). The original azimuth difference pattern displays near-in sidelobes of −15 dB at around 25°. The azimuth difference pattern with the vertical strip excluded is markedly different. The near in sidelobes are −27 dB at 25° and deep nulls are formed.

In both cases, the sidelobes have been suppressed 10 dB or greater. This is most significant in the case of the near in sidelobe which is critical to clutter and jamming concerns.

FIG. *3a* shows an alternative embodiment of the invention wherein a center section of elements are selectively excluded in generating the difference patterns. FIG. *3b* shows a sum and difference network for providing the desired sum and difference signals. The circuit of FIG. *2b* has the advantage of using only five hybrids, which is of high utility for applications where space is very important (i.e., missile radar systems, etc.). Data for the embodiment shown in FIG. *3a* and *3b* is comparable to that for the embodiment shown in FIG. *2a* and FIG. *2b*.

Thus, it can be seen that one embodiment of the invention, by selectively excluding a vertical strip of elements along the azimuth axis can reduce the sidelobes for the azimuth difference pattern and, by selectively excluding a horizontal strip of elements along the elevation axis can reduce the sidelobes for the elevation difference pattern.

It can also be seen that excluding other predetermined cross section patterns of the aperture may permit further optimization of the signals i.e., permit other combinations for reducing the sidelobes in the difference patterns while minimizing circuit complexity and maintaining sum signal quality.

It should be further understood that the illustrated embodiments have been set forth for clarity and should not be interpreted as limiting the following claims.

What is claimed is:

1. A monopulse antenna and single feed network forming sum and difference signals used by a radar system for tracking a target:

said monopulse antenna comprising an array of excitable elements symmetrically disposed about azimuth and elevation axes, said array defining an aperture having a cross-sectional area for transmitting energy toward said target and receiving return energy therefrom, said aperture being partitioned into substantially equal quadrants each quadrant being separated from adjacent quadrants by a respective strip of excitable elements extending from the center of said array to the periphery of said array; and circuit means coupled to said array comprising:

a first hybrid (41) having a first input coupled to a first strip (K) and a second input coupled to a second strip (I) for forming a sum output and a difference output;

a second hybrid (42) having a first input coupled to a third strip (H) and a second input coupled to a fourth strip (J) for forming a sum output and a difference output;

a third hybrid (43) having a first input coupled to a first quadrant (A) and a second input coupled to a second quadrant (D) for forming a sum output and a difference output;

a fourth hybrid (44) having a first input coupled to a third quadrant (B) and a second input coupled to a fourth quadrant (C) for forming a sum output and a difference output;

a fifth hybrid (51) having a first input coupled to the sum output of said first hybrid and a second input coupled to the sum output of said second hybrid for providing their sum as an output;

a sixth hybrid (52) having a first input coupled to the sum output of said third hybrid and a second input coupled to the sum output of said fourth hybrid for forming a sum output and a difference output;

a seventh hybrid (53) having a first input coupled to the difference output of said third hybrid and a second input coupled to the difference output of said fourth hybrid for forming their sum as an output;

an eight hybrid (61) having a first input coupled to said sum output of said fifth hybrid and a second input coupled to said sum output of said sixth hybrid for forming their sum as an output;

a ninth hybrid (62) having a first input coupled to said difference output of said first hybrid and a second input coupled to said difference output of said sixth hybrid for forming their sum as an output; and a tenth hybrid (63) having a first input coupled to said difference output of said second hybrid and a second input coupled to said sum output of said seventh hybrid for forming their sum as an output.

2. A monopulse antenna and single feed network forming sum and difference signals used by a radar system for tracking a target:

said monopulse antenna comprising an array of excitable elements symmetrically disposed about azimuth and elevation axes, said array defining an aperture having a cross-sectional area for transmitting energy toward said target and receiving return energy said aperture being partitioned into substantially equal quadrants and a central portion surrounding an intersection of said axes; and circuit means coupled to said array comprising:

a first hybrid (81) having a first input coupled to a first quadrant (A) and a second input coupled to a second quadrant (B) for forming a sum output and a difference output;

a second hybrid (82) having a first input coupled to a third quadrant (C) and a second input coupled to a fourth quadrant (D) for forming a sum output and a difference output;

a third hybrid (91) having a first input coupled to the sum output of said first hybrid, and a second input coupled to the sum output of said second hybrid, for forming a sum output and a difference output;

a fourth hybrid (92) having a first input coupled to said difference output of said first hybrid and a second input coupled to the difference output of said second hybrid, for forming a difference output; and a fifth hybrid (101) having a first input coupled to said central portion (E) and a second input coupled to said sum output of said third hybrid for forming a sum output.

* * * * *